United States Patent

[11] 3,634,138

[72] Inventors: John Davidson Voorhies
 New Canaan, Conn.;
 Mary Ellen Nichols, Highland Park, N.J.
[21] Appl. No. 32,349
[22] Filed Apr. 27, 1970
[45] Patented Jan. 11, 1972
[73] Assignee American Cyanamid Company
 Stamford, Conn.

[54] EXTENDED LIFE SECONDARY CELLS
 3 Claims, No Drawings
[52] U.S. Cl.................................................. 136/6,
 136/107, 136/137
[51] Int. Cl..........................................H01m 35/00,
 H01m 21/00
[50] Field of Search............................ 136/137,
 136, 83, 6, 103, 107, 161, 165, 155, 154

[56] References Cited
UNITED STATES PATENTS

| | | | |
|---|---|---|---|
| 3,565,696 | 2/1971 | Nordblom..................... | 136/155 |
| 3,481,792 | 12/1969 | Davis et al..................... | 136/137 |
| 3,468,708 | 9/1969 | Davis et al..................... | 136/6 |
| 3,357,865 | 12/1967 | Davis et al..................... | 136/137 |
| 3,291,645 | 12/1966 | Gould............................ | 136/107 |
| 3,291,646 | 12/1966 | Gould............................ | 136/107 |
| 3,285,783 | 11/1966 | Gould............................ | 136/107 |
| 3,253,960 | 5/1966 | Schaefer....................... | 136/107 |
| 3,057,760 | 10/1962 | Dereska et al................. | 136/137 |

Primary Examiner—Anthony Skapars
Attorney—Samuel Branch Walker

ABSTRACT: The useful shelf and cycle life of secondary cells using a zinc anode, and a azobisformamide or substituted azobisformamide depolarizer is increased by coating the zinc with a small amount of a tetraalkylammonium salt, and/or increasing the content of ammonium chloride in the electrolyte above its solubility limit.

3,634,138

EXTENDED LIFE SECONDARY CELLS

SUMMARY OF THE INVENTION

This invention relates to improvements in secondary dry cells having a zinc anode and using an azobisformamide or substituted azobisformamide depolarizer, by using a tetraalkylammonium salt to coat the zinc and improve cycle life. Excess ammonium chloride also improves the cycle life of secondary cells using a zinc anode and an ammonium chloride electrolyte in conjunction with a carbon containing depolarizing mixture.

For many years, the Leclanche type cell has been considered a primary cell, and whereas rechargers for such cells have been the subject of sales promotional programs, any recharging has been under highly specialized conditions, or illusory. The use of azobisformamides, also called azodicarbonamides, in the depolarizing mixture of zinc anode, zinc chloride-ammonium chloride electrolyte cell is disclosed in U.S. Pat. No. 3,357,865, Davis, Kraebel and Parent, "Dry Cells," Dec. 12, 1967. U.S. Pat. No. 3,468,708, Davis Voorhies and Schurdak, "Rechargeable Dry Cells and Method Using Same," Sept. 23, 1969 and U.S. Pat. No. 3,481,792 Davis, Kraebel and Parent, "Uncharged Dry Cells with a Biurea Depolarizer," Dec. 2, 1969 give additional information on cells of this type.

U.S. Pat. No. 3,057,760, Dereska et al. "Polyhalogen Depolarizers," Oct. 9, 1962 discloses the use of tetraalkylammonium polyhalides, including tetramethylammonium tetrachloroidide, $(CH_3)_4NICl_4$, as the depolarizer in cells, including zinc anode cells.

Inhibitors have been added to the mixture in dry cells in an attempt to reduce the corrosion of zinc. U.S. Pat. No. 3,285,783, Gould, "Corrosion Inhibitor in Dry Cell Batteries," Nov. 15, 1966 discloses as an additive compounds of the formula $RNH(OR_1)PO(ONH_3R_2)$ wherein R is an aliphatic hydrocarbon radical containing 12-18 carbon atoms inclusive, $R_1$ is an aliphatic hydrocarbon radical containing one to 10 carbon atoms inclusive and $R_2$ is an aliphatic hydrocarbon radical containing 12-18 carbon atoms inclusive.

U.S. Pat. No. 3,291,646, Gould, "Corrosion Inhibitor in Dry Cell Battery" Dec. 13, 1966, discloses the use of higher alkylamines, such as hexadecylamine, as corrosion inhibitors in zinc-ammonium chloride dry cells.

U.S. Pat. No. 3,291,645, Gould, "Corrosion Inhibitor in Dry Cell Battery," Dec. 13, 1966 discloses the use of additives of the formula $RSO_2NHCH_2COOM$ wherein R is 8-20 carbon alkyl, and M is an alkali metal to reduce zinc corrosion in zinc-ammonium chloride dry cells.

The use of tetraethylammonium bromide in alkaline systems to retard dendrite formation is referred to in Diggle et al., Journal of the Electrochemical Society 116, 1503 (1969) and 117, 65 (1970), at 67. Lead is considered preferable.

These references and many others show a continuing effort on the part of many inventors to increase the shelf life of Leclanche dry cells, with little or no comment on cycle life, because such cells are commonly considered as primary cells only.

Efforts are also continually being made to increase the cycle life, that is the number of times a battery may be discharged and charged before reaching the end of its useful life, in secondary cells.

Because batteries are needed for many uses, many different sizes, shapes and types of cells are used; other variables are (1) the temperature conditions during storage, (2) the temperature conditions at the time of use, (3) the drain rates on cells, (4) the time elapsing between manufacture and use, (5) the time between parts of discharge in one cycle, or between charging and discharging. It is not possible to build any one cell which will be best under all conditions of use and no single test can be representative of all commercial use conditions. In the cells disclosed in U.S. Pat. No. 3,357,865 supra, cells having a good cycle life are shown. Some of these cells are described as having satisfactory characteristics up through 40 or more cycles. Unfortunately the cycle life at lower drain rates, particularly when subjected to intermittent discharge, with time elapsing during the discharge and charge cycles or between the cycles, is reduced.

For purposes of the present tests, failure was defined as having less than 50 percent efficiency of discharge. That is the cell has less than half the capacity to be expected from the quantity of depolarizer used in the cell.

It has now been found that cycle life of such batteries can be increased for any particular duty cycle by coating the zinc anode with a tetraalkylammonium salt. Among the specific tetraalkylammonium salts found to be useful are the following:
tetramethylammonium iodide
tetraethylammonium p-toluene sulfonate
tetrabutylammonium bromide
tetra-n-hexylammonium iodide
tetraheptyl ammonium iodide
methyl-tri-n-butylammonium iodide
methyl-tricapryl ammonium chloride
ethyl-tri-n-butylammonium iodide
n-propyl-triethylammonium iodide
n-propyl-tri-n-butylammonium iodide
n-butyl-triethylammonium bromide
hexadecyl-trimethylammonium bromide
and the like.

Methyl-tri-n-butyl-ammonium iodide and ethyl-tri-n-butylammonium iodide are particularly effective. Twenty-five to 500 milligrams on the surface of the zinc of a "D" size cell gives good results. More may be added, but is not as economical.

Such compounds may be added to the cathode mix, but more efficient utilization is achieved by coating directly on the zinc of the anode by dissolving the quaternary ammonium salt in a volatile solvent, and coating the zinc anode with the solution, then permitting the solvent to evaporate. As the solvent is evaporated, the choice of solvent is immaterial, but methanol is very convenient as an inexpensive solvent which is quite volatile and may be readily used for the purpose. To avoid unduly lengthening, the explanation, the details of cell manufacture, use and testing are incorporated by reference from the specification of U.S. Pat. No. 3,357,865 supra.

The following examples are representative of results to be expected. For any particular cell, the size of the cell, the shape of the cell, the temperature of storage, the temperature of use, the drain rate, interruption in drain, the charge rate and the time of holding in the charged, partially charged and the uncharged condition have an influence on cycle life and hence except under controlled conditions, where the various parameters are essentially the same, the cycle life is subject to variation. To be valid, comparisons must be under analogous conditions.

Any of the battery carbon blacks may be used, but data in the tables specifies the specific blacks used in obtaining the data set forth.

In the following examples, parts are by weight, unless otherwise specified, and all conditions and concentrations were held constant, except as set forth.

EXAMPLE I

Treatment of Zinc Anode

One hundred milligrams of a quaternary ammonium salt was dissolved in 0.5 milliliters of methanol, transferred to the inside of a "D" size zinc can and rolled around to evenly coat the inside of the can while the methanol evaporated. (A "D" cell has an outside diameter of 1 11/32 inches a can height 2¼ inches and a total height of 2 13/32 inches)

EXAMPLE II

The electrolyte used consisted of:

| | |
|---|---|
| 17% | $ZnCl_2$ |
| 27% | $NH_4Cl$ |
| 0.15% | $HgCl_2$ |

A laminated cellophane separator as described in U.S. Pat. No. 3,357,865 was used. A zinc can anode as prepared in example I was charged with a mixture consisting of 21 milliliters of electrolyte, 4.5 grams of carbon black and 4.5 grams of the depolarizer. The carbon black used was 90 percent Shawinigan acetylene black and 10 percent Columbian SA 40-220 carbon black (or 100 percent Shawinigan acetylene black as indicated). The depolarizer chosen was 1,1'-azobis(n-butylformamide), ground to a particle size range of about 2 to 10 microns.

The first test conducted was a continuous discharge through a 50-ohm resistor to an end point of 0.6 volts followed by charging from a 1.7-volt source through a 4.0-ohm series resistor for about 12 to 16 hours, until the voltage across the cell reached 1.6 volts.

The second test was a 41.7-ohm intermittent discharge in which the cell is discharged for 4 hours a day for 5 days a week through a 41.7-ohm resistance to an end point of 0.6 volts. The cell was charged as with the 50-ohm discharge.

A 25-ohm intermittent discharge test was used in which a 25-ohm resistance was connected across the cell with the cell being discharged for 4 hours a day and 5 days a week to an end point voltage of 0.6 volts. After discharge the cell was charged as described above.

A 2-ohm continuous test was made by discharging the cell through 2-ohm resistance on continuous discharge until the voltage dropped to 0.6 volts, after which the cell was charged as above.

As a matter of operating convenience, the cells were automatically cycled, using automatic controls. The following table summarizes results obtained:

TABLE I

| Additive | Cycle life, cycles to failure | | | |
|---|---|---|---|---|
| | 50-ohm cont. | 41.7-ohm int. | 25-ohm int. | 2-ohm cont. |
| Tetraethylammonium p-toluene sulfonate | 30 | 10 | | |
| Ethyl-tri-n-butylammonium iodide | *30 | 15 | 24 | |
| Methyl-tri-n-butylammonium iodide | 64 | 18 | 19 | 70 |
| Hexadecyl-trimethylammonium bromide | 35 | | | |
| Blank control—no quaternary salt | 26 | 10 | 14 | 60 |

*Indicates cycle life is continuing—test not completed; all cells had 90% Shawinigan acetylene black, 10% Columbian SA 40-220 carbon black.

The cells were considered to have failed when the capacity of the cell was less than 50 percent of the coulombic efficiency anticipated from the quantity of the depolarizer present. The cells could be used at reduced capacity for additional cycles, but the 50 percent point was taken as a cutoff for failure.

Certain of the tests have a plus after them to indicate that the cells were still on test and operating after the number of cycles indicated.

It will be noted that the cycle life varies markedly with the discharge conditions. Intermittent cycle life is considerably fewer cycles than the continuous duty cycle life. All tests were conducted at room temperature of approximately 76° F. (25° C.).

All these tests show a considerable improvement in cycle life with the present quaternary salts. The number of useful cycles under field conditions can vary considerably depending upon the temperatures at which the cells are stored, the time between manufacture and start of cycling, the time between various portions of the duty cycle, the type of load and the acceptable end voltages for a cycle.

The present cells are distinctly unusual in that the cells may be deep discharged, that is discharged until the voltage of the cell drops sharply without damage to the cell, or a major shortening of the useful life. Most secondary cells have the useful life greatly shortened if the cell is discharged deeply. In many types of use, the user does not have complex equipment to indicate the approaching end of a duty cycle and in a radio or flashlight, as typical loads, the average user runs the equipment until the voltage drops to the point that the item is no longer functioning effectively at which time the cells are then recharged. The present cells are uniquely adapted to this type of duty cycle.

The cycle life with intermittent duty at low drain rates shows the present additives up to best advantage. As each cycle on the 41.7-ohm intermittent test takes about 10 working days, data on such cycles, and cycles including long storage is somewhat abbreviated, but test results indicate that improved life after storage is to be anticipated.

EXAMPLE III

Cells were prepared as in examples I and II, but using 300 milligrams of the quaternary ammonium salt shown, in sufficient methanol to dissolve. Conditions of manufacture and testing were otherwise the same.

TABLE II

| Additive | Cycles to failure | | |
|---|---|---|---|
| | 50-ohm cont. | 41.7-ohm int. | 25-ohm int. |
| 90% Shawinigan acetylene black; 10% Columbian SA 40-220 carbon black: | | | |
| Control—no additive | 26 | 10 | 14 |
| Methyl-tri-n-butyl-ammonium iodide | 69 | *8 | 17 |
| 100% Shawinigan acetylene black: | | | |
| Control—no additive | 26 | 10 | 14 |
| Ethyl-tri-n-butyl-ammonium iodide | *32 | *8 | |

*Indicates test on cycle life is continuing.

EXAMPLE IV

Cells were prepared as in example II using 100 milligrams of the quaternary ammonium salt, but with 100 percent Shawinigan acetylene black.

TABLE III

| Additive | Cycles to failure | | |
|---|---|---|---|
| | 50-ohm cont. | 41.7-ohm int. | 25-ohm int. |
| Control—no additive | 26 | 10 | 14 |
| Methyl-tri-n-butylammonium iodide | *34 | *7 | *9 |
| Ethyl-tri-n-butylammonium iodide | *38 | *7 | *14 |

*Indicates test on cycle life is continuing.

EXCESS AMMONIUM CHLORIDE

For an electrolyte to be handled as a liquid, essentially all of the materials therein must be in true solution, or at least colloidal. If more ammonium chloride is present than will dissolve in the electrolyte when the electrolyte is added as a liquid, the ammonium chloride tends to settle out, and it becomes difficult to insure that all batteries in a batch are equal.

Modern theories as to the structure of water indicate hydrogen bonding between adjacent molecules as having considerable effect on the characteristics of water and the hydrogen bonding is effected by dissolved materials, hence it would appear that when the electrolyte is supersaturated or saturated with respect to ammonium chloride, the water has different characteristics as regards to interaction at the zinc separator interface. As solubilities vary with temperature and as the time required for complete solution may be comparatively long, cells are conveniently prepared by adding additional solid ammonium chloride to the mixture of carbon and a polarizer.

In cells as prepared in example II above, additional quantities of solid ammonium chloride were added and ground with the depolarizer-carbon mixture before or as the electrolyte was added thereto. Thus the mixture as charged contained an excess of ammonium chloride such that, during storage, enough ammonium chloride was present to keep the electrolyte saturated. At the time of use, there is actually some ammonium chloride residual in solid form.

In tests conducted using the cell as a primary cell, that is a single discharge, the additional ammonium chloride had little or no effect. The effect, if any, was so small that it could not be distinguished from experimental error.

EXAMPLE V

When used on recharged cycles, as a secondary cell, the extra ammonium chloride is found to give superior life on extended tests. Under conditions otherwise the same as set forth in example II above, but no quaternary treatment the following results were obtained with cells as in example II, but with the added ammonium chloride.

TABLE IV

| Additive per cell | Cycle life, cycles to failure [1] | | |
|---|---|---|---|
| | 50-ohm cont. | 41.7-ohm int. | 25-ohm int. |
| 90% Shawinigan acetylene black; 10% Columbian SA 40-220 carbon black: | | | |
| None (control) | 26 | 10 | 14 |
| $NH_4Cl$, 2.5 g | *44 | *8 | *12 |
| $NH_4Cl$, 5.0 g | *37 | 18 | 16 |
| 100% Shawinigan acetylene black: | | | |
| None (control) | 26 | 14 | 10 |
| $NH_4Cl$, 2.5 g | | *6 | *13 |
| $NH_4Cl$, 5 g | *45 | *6 | *13 |

[1] 50% efficiency on discharge.
*Test still running.

Both solid ammonium chloride in the cell mixture and the zinc anode coating with the tetraalkylammonium salt can be used.

We claim:

1. In a dry cell comprising a zinc anode, a separator, an ammonium chloride-zinc chloride electrolyte, and an azobisformamide-carbon depolarizer mixture, the improvement comprising: a coating of a tetraalkylammonium salt in contact with the zinc anode, said alkyl groups having from one to 18 carbon atoms each, and not necessarily the same alkyl group.

2. The cell of claim 1 in which the salt is methyl-tri-n-butylammonium iodide.

3. The cell of claim 1 in which the salt is ethyl-tri-n-butylammonium iodide.

* * * * *